Oct. 6, 1925.
J. R. W. GREGG
1,556,104
METALLIC PISTON RING
Filed June 28, 1921
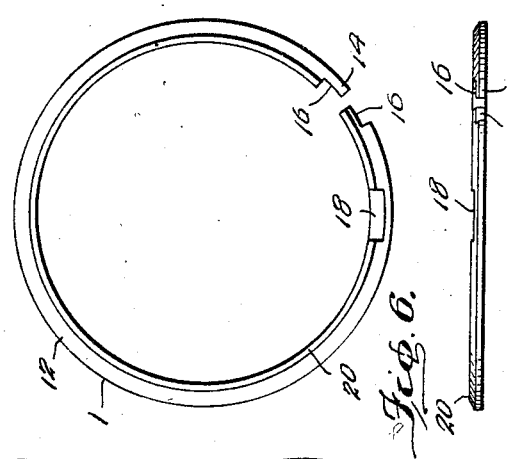
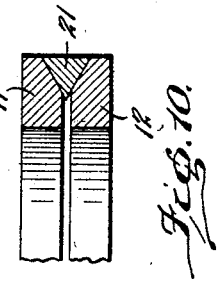
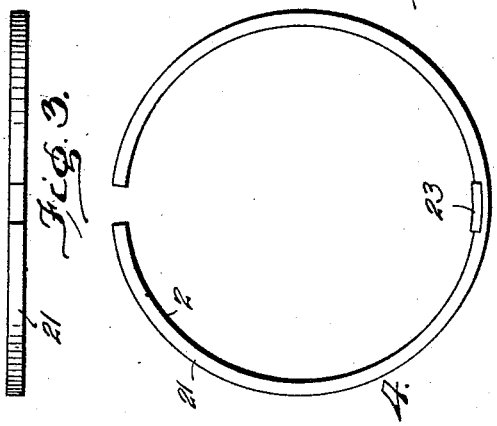
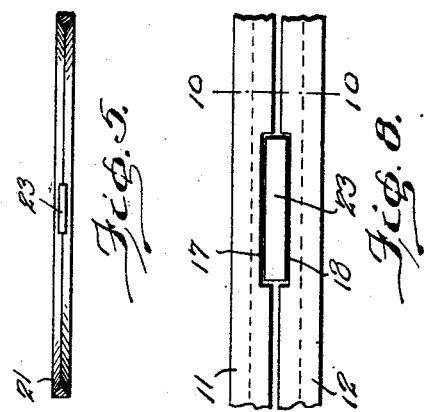
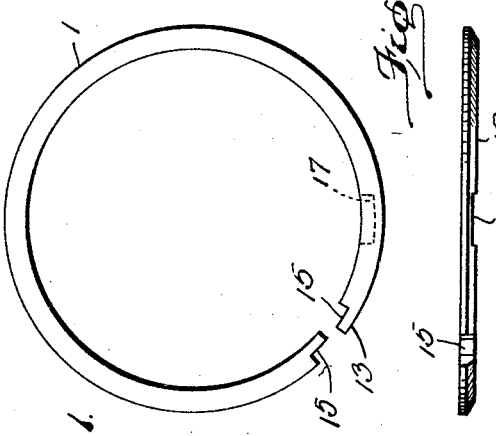
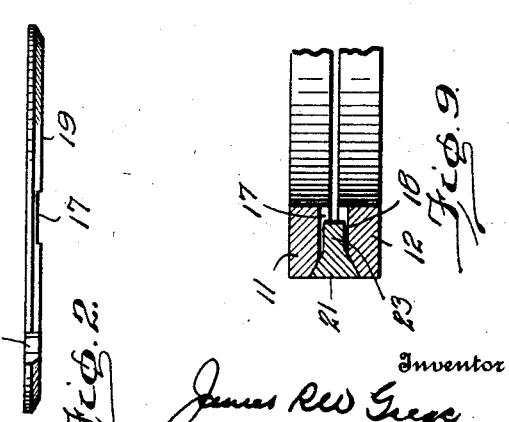
Inventor
James R.W. Gregg
By Edwin S. Clarkson
Attorney Patented Oct. 6, 1925.

1,556,104

UNITED STATES PATENT OFFICE.

JAMES R. W. GREGG, OF MEDFORD, OREGON.

METALLIC PISTON RING.

Application filed June 28, 1921. Serial No. 480,970.

*To all whom it may concern:*

Be it known that I, JAMES R. W. GREGG, a citizen of the United States, residing at Medford, in the county of Jackson and State of Oregon, have invented certain new and useful Improvements in Metallic Piston Rings, of which the following is a specification.

Internal combustion engines, of the type embodying a cylinder and a piston arranged to operate in the cylinder, almost universally employ a metallic packing to maintain a close joint between the cylinder and piston, said packing being fitted in an annular groove or grooves formed in the outer wall of the piston and consisting of a metallic elastically expansible ring or rings.

Unless the packing fits the side walls of the groove, or seats closely loss of power results, carbon and oil accumulate in the grooves and interfere with the action of the power or movement of the piston, said close fit in the grooves must be maintained during the life of the motor or engine. Also a close fit must be maintained between the piston packing and the wall of the cylinder and there should be no opening at the ends of the packing rings whereby gases or oil can escape through such opening.

A piston packing was invented and patented November 21, 1916, #1,205,941, by C. E. Whiteman and myself, which accomplishes the desired result of making a close fit to the wall of the cylinder and to the walls of the annular piston packing groove in the piston, also maintains this close fit during the life of the piston packing, by automatically taking up its own wear diametrically and transversely; in so doing it prevents an excess of oil to pass the piston packing, which materially improves the efficiency of the engine.

During several years' experience with this improved piston packing it is found advantageous to seal more thoroughly the openings at the ends of the rings, whereby the passage of oil is more thoroughly prevented and the escape of gases or power is more thoroughly sealed. This is more especially desired after the packing has been used for a considerable time, said gaps or openings having become considerably larger due to the natural wear of the piston packing on its outer periphery and due to the tendency of the three pieces comprising the complete packing of lining up their openings or ends. In other words due to the unequal surface of the cylinder wall and to the pressure exerted on the piston packing during the power or explosion stroke of the engine, these three pieces forming one complete piston packing have a tendency to creep within themselves and their openings becoming lined up in a direction parallel with the cylinder, in which condition oil and power can pass in a limited amount, through this opening and by the packing.

The present invention aims to improve the above named patent by designing a special cut on the ends of each piece comprising the outer members of the packing, using the ordinary cut on the ends of the intermediate member, and providing a locking device whereby the several cuts or joints are maintained in a predetermined position in relation to each other and are held in this relative position during the life of the packing. The combination of which will prevent the passage of oil and gases, either the live gas when being compressed prior to being fired, or the power gas on the power stroke of the engine. This combination of cuts in the side members and the locking device, when assembled in one complete packing ring, will effectually seal the joint of the complete packing against the escape of gases or the passage of oil even after considerable wear has taken place due to the natural friction of the packing against the wall of the cylinder, and will effectually seal the joint against leakage due to improper fitting of the several members of the complete packing when being installed. By effectually sealing at all times the gap or opening of the packing at the ends of the several pieces when assembled into one complete packing the efficiency of the motor or engine is considerably increased thereby causing a saving of fuel and oil, making this a new and useful improvement to piston packing.

In the drawings Figure 1 is a top plan view of a piston ring member embodying my invention.

Figure 2 is an edge view of the same.

Figure 3 is an edge view of the intermediate ring member.

Figure 4 is a top plan view of the same.

Figure 5 is a transverse sectional view of Figure 4. Figure 6 is a top plan view of a ring member showing the reverse face of the ring shown in Figure 1.

Figure 7 is an edge view of Figure 6.

Figure 8 is an enlarged detail view of the three rings assembled looking at the inner diameter face of the rings on the line A Figures 4 and 5.

Figure 9 is an enlarged detail transverse sectional view of Figure 8 on the line A.

Figure 10 is an enlarged detail sectional view on the line 10—10, Figure 8.

The reference numerals 11 and 12 designate the two ring members composing the outer or side rings of the packing, both of the same construction and each provided with lap joints, or step cuts, 13 and 14, made with the laps or steps so that the faces 15 and 16 are parallel with the outer periphery of its rings 11 and 12.

Both rings 11 and 12 have corresponding recesses 17 and 18 on the inner side or face thereof, but they do not extend to the outer periphery of either ring, but terminate in the inclined faces 19 and 20 of the rings 11 and 12.

The intermediate or middle ring member of the packing 21 is triangular in cross section and is provided with an ordinary cut 22 and is further provided with a lug or lock 23, extending toward the axis of the ring, the lug being formed substantially on the apex of the triangle of the ring 21 as best seen in Figures 4 and 5, extending partially on either side of said apex but does not extend to the outer periphery of the ring 21 and, as will be seen clearly in Figure 5, is not as wide as the outer periphery of the ring 21. This locking lug 23 is adapted, when the three rings are assembled, to enter the recesses 17 and 18 of the outer rings 11 and 12, as shown in Figure 8, thereby locking the three rings, when assembled, against relative rotation but leaving them free to expand diametrically and transversely during the life of the packing. The lock 23 is made in a plane parallel with the periphery of the packing and of the inside surfaces.

It will be noted from a close study of the drawing that the lug or lock 23 attached to the middle member 21 of the packing is so placed that it will not interfere either collectively or independently with the action of the outer members 11 and 12, either to expand diametrically or transversely, yet holds the three members in their predetermined position around the periphery of the packing. It will also be noted that this locking device is entirely inside the packing when assembled in its working position, there being no openings either on the outer periphery or on the outer sides of the packing to collect dirt or carbon, thereby interfering with the action of the packing or the power of the engine.

It is to be understood that the lap joints or step cuts in the outer members are to be made parallel with the periphery of the packing and the flat surfaces or steps are to be closely engaged with each other, thereby oil and gases are prevented from passing from the outer surface to the inner surface of the packing even though the packing is considerably worn and the gaps stand open in a line with the periphery of the packing.

It will be noted that by locking the several members of the packing with their joints at different points around the periphery of the packing that the middle or intermediate members will cover any openings or gap that may exist transversely to the packing and on its outer diameter, by having its solid body across the outer half of the lap joint of the outer members. It will also be noted that the lap joints of the outer members having their flat surfaces parallel with the periphery of the packing and in close contact with each other prevent oil or gases from passing from the outer surface to the inner surface or under the packing, and the middle member having its solid body across the joint of the outer members prevents oil or gases to pass parallel with the cylinder, the combination of which effectually seals the joint of the complete packing.

Experience with the above named patent in actual service covering a year or more and with hundreds of automobile engines has proven that tempered high carbon steel for the intermediate ring is more efficient and of longer life than the universally employed cast iron used in piston packing and inasmuch as it is cheaper to form the lug or lock on the middle member by welding or forming it integral; also the extended portions of the lap joints of the outer members would be much stronger if the members were made from steel, it becomes advisable to make all the members of the packing from either high carbon steel, tempered, or from lower carbon steel casehardened and tempered.

What I claim is:

1. A piston packing comprising two outer and one intermediate rings, each outer ring having lap joints cut in their ends, with the overlapping and engaging faces concentric with the periphery of said outer rings, a lock on the intermediate ring and recesses in the adjacent faces of the outer rings adapted to receive said lock, to lock the said rings against relative rotation.

2. A piston packing comprising two outer rings each having an inner face parallel with the outer face thereof and terminating near the periphery in an outwardly inclined face, a recess formed in each ring in said parallel face and terminating about midway of said inclined face, and an intermediate ring triangular in cross section adapted to engage said inclined faces, and a lock projecting inwardly from the inner periphery of the intermediate ring and adapted to enter the said recesses in the outer rings and lock all of the rings against relative rotation.

In testimony whereof I affix my signature.

JAMES R. W. GREGG.